United States Patent [19]

Woodside

[11] Patent Number: 5,281,312
[45] Date of Patent: Jan. 25, 1994

[54] METHOD AND APPARATUS FOR KILLING INFECTIONS BACTERIA AND UNDESIRABLE MICROORGANISMS IN LARGE LAND AND WATER AREAS

[76] Inventor: Arthur G. Woodside, 60 Birdie Dr., Sildell, La. 70460

[21] Appl. No.: 921,657

[22] Filed: Jul. 30, 1992

[51] Int. Cl.⁵ .................... C25B 9/00; C02F 7/00
[52] U.S. Cl. .................... 204/130; 204/271; 204/275; 204/292; 204/293; 210/170; 210/747; 210/764
[58] Field of Search .......... 204/275, 130, 242, 131; 210/747, 764, 170

[56] References Cited

U.S. PATENT DOCUMENTS

| | | | |
|---|---|---|---|
| 2,046,467 | 7/1936 | Krause | 210/764 X |
| 2,977,296 | 3/1961 | Ryan | 204/275 X |
| 3,092,552 | 6/1963 | Romans | 210/764 X |
| 3,756,933 | 9/1973 | Greenberg | 202/149 |
| 3,769,196 | 10/1973 | Wikey | 210/764 X |
| 4,291,125 | 9/1981 | Greatbatch | 204/131 X |
| 4,328,084 | 5/1982 | Shindell | 204/228 |
| 4,337,136 | 6/1982 | Dahlgren | 204/242 |
| 4,437,962 | 3/1984 | Yeoman | 204/229 |
| 4,525,253 | 6/1985 | Hayes et al. | 204/275 X |
| 4,710,282 | 12/1987 | Chak et al. | 204/228 |
| 4,755,268 | 7/1988 | Matsuo et al. | 204/130 X |
| 4,769,119 | 9/1988 | Grundler | 204/149 |
| 4,936,979 | 6/1990 | Brown | 210/85 |
| 4,992,156 | 2/1991 | Silveri | 204/228 |
| 5,013,417 | 5/1991 | Judd, Jr. | 204/271 X |

Primary Examiner—Donald R. Valentine
Attorney, Agent, or Firm—John E. Benoit

[57] ABSTRACT

A method and a portable apparatus is provided which can be transported to the area of treatment, generate silver ions or ions of other selected elements such as copper, uniformly distribute the ions over both confined and extended areas of water and land, and destroy infectious bacteria and/or other undesirable microorganisms in such areas. Water under pressure is passed through a manifold containing silver electrodes (or other desired metal electrodes) which are energized to produce ions. The solution with the high potency disinfecting ions is delivered to a sprinkler or other form of spraying device. The system is portable so that the apparatus can be moved to multiple locations or maneuvered within a given treatment location.

9 Claims, 3 Drawing Sheets

METHOD AND APPARATUS FOR KILLING INFECTIONS BACTERIA AND UNDESIRABLE MICROORGANISMS IN LARGE LAND AND WATER AREAS

The present invention relates generally to water purification and more specifically to an apparatus and method for generating and uniformly distributing ions of selected elements (primarily silver and secondarily copper) over surface areas of both confined and extended areas of water and land without disturbing or requiring modification to the treated areas in order to destroy infectious bacteria and/or other undesirable microorganisms in such areas.

BACKGROUND OF THE INVENTION

Considering the world's environmental situation, it is necessary that all resources be effectively and efficiently utilized in order to both eliminate existing pollution and prevent continuing pollution.

For many years silver has been known to be a potent and highly effective purification agent through its killing of infectious bacteria. Silver has been used for dinnerware with the belief that it had sterilization characteristics among other reasons. Silver nitrate has long been used in hospitals for babies and others because of its disinfection capabilities. During these and other similar disinfecting or sterilization applications, silver has been used with comfort and trust on the basis that it has shown no undesirable side effects.

When the National Aeronautic and Space Administration was searching for a means to purify the recycled water for the Apollo astronauts, silver was selected because of its high potency disinfecting capabilities. Being the reference base for the International Ampere and Faraday's Law, it was well known to be readily ionized. Accordingly, N.A.S.A. developed a simple electrolytic system to generate silver ions to be circulated in the water to be treated. A control unit generates a direct current which is applied across electrodes of specially formulated silver alloy immersed in the water being treated. The dose rate at which these ions are generated and liberated into the water is set and maintained by solid-state microprocessor circuitry in the control unit.

This same system, with the addition of copper to the silver and with other minor adaptations, is now being used in the treatment of water in many commercial and industrial applications such as swimming pools, spas, air conditioning cooling towers, food processing, etc.

At the same time, several patents have been issued in recent years which cover unique ways of using silver in water treatment and disinfecting.

In addition to the above systems which utilize silver or copper, there are many which still utilize chlorine and its many compounds to disinfect water. Extensive efforts are underway, however, to eliminate the use of chlorine and halogens. Radiation-type systems such as ultraviolet have been introduced in this effort. These systems are being used in food processing and some sewerage treatment plants.

The current systems require that all water being treated must pass over, under, or through the treatment mechanism to pick up the treatment produce. The total water supply, now with the treatment product, becomes disinfected and is ready for the user.

As will be shown in the following calculations, it is highly impractical, and close to impossible, for the current systems to utilize more than a minute fraction of the high potency treatment capability of silver.

Given the following:
1. By Faraday's Law, the amount of silver ions released in one second with a one ampere current flow between the silver electrodes is 0.001118 grams.
2. The kill level for infectious bacteria, or its disinfecting capability, is 5/15 PPT (parts of silver per trillion parts of treated media).

Using the worst case of 15 parts, versus the 5 parts at the low end of the scale, the amount of water, or gallon flow per second, which can be treated in a one-second flow of electrical current across the silver electrodes is determined by the following ratio:

$$\frac{15}{1,000,000,000,000} = \frac{0.00118 \text{ GRAMS}}{\text{FLOW}}$$

$$\text{FLOW} = 0.001118 \text{ GRAMS} \times \frac{1,000,000,000,000}{15}$$

$$\text{FLOW} = \frac{1,118,000,000 \text{ GRAMS}}{15}$$

$$\text{FLOW} = 74,533,333 \text{ GRAMS}$$
$$= 74,533,333 \text{ GRAMS} \times \frac{1 \text{ Kg}}{1,000 \text{ g}} \times \frac{2.2046 \text{ Lb}}{1 \text{ Kg}} \times \frac{1 \text{ GAL}}{8.3454 \text{ LB}}$$

$$\text{FLOW PER SECOND} = 19689.43 \text{ GAL}$$

As noted above, it would be virtually impossible to economically and effectively build a treatment apparatus to flow 19,689 gallons per second through it to utilize the full treatment capability of silver. It is possible, and highly practical, to provide a treatment apparatus through which a minute part of the water to be treated is passed through the treatment apparatus and subsequently effectively mixed with untreated water so that the disinfection process is successfully completed.

It is an object of this invention, therefore, to provide a method and a portable apparatus which can be transported to the treatment site, provide concentrated treatment to a part of the total water to be treated through the generation of silver ions in a manifold through which this water part flows, uniformly distribute this water part with the silver ions to the water whole, and, thus, provide treatment to both confined and extended areas of water which otherwise have been untreatable through the elimination of undesirable bacteria and other microorganisms in this area.

Another object of this invention is to provide a method and a portable apparatus which ca be transported to the treatment site, provide a concentrated treatment solution in an auxiliary source of water through the generation of silver ions in a manifold through which this auxiliary water source flows, uniformly distribute this water with its silver ions to both confined and extended areas of land and water which otherwise have been untreatable, and, thus, provide treatment through the elimination of undesirable bacteria and other microorganisms in the area.

A further object of this invention is to provide a method and a portable apparatus which can be used by airplane, motor vehicle, boat, and/or other transportation vehicle to provide treatment through the generation of silver ions in a manifold through which an auxiliary water source flows from a storage tank, delivering this water with its silver ions back to this storage tank to obtain a concentrated solution of silver-ionized water, and then utilizing one or more of these transportation vehicles to uniformly distribute this concentrated solution of silver ions to both confined and extended areas of land and/or water and, thus, provide treatment through the elimination of undesirable bacteria and other microorganisms in the area.

A still further object of this invention is to provide a method and a portable apparatus to provide treatments as described above except with other elements or alloys such as copper and copper/silver and for treating living matter which they affect such as algae.

Yet another object of this invention is to provide a portable apparatus which can be moved and used in different treatment areas, moved to and carried in different transportation and distribution vehicles, and readily moved within a treatment area to accomplish the objectives described above.

It is to be understood that the present invention relates to silver ions and copper ions used either singly or in combination.

These and other objects of the invention will become apparent from the following specification, together with the accompanying drawings.

BRIEF SUMMARY OF THE INVENTION

A portable apparatus is provided for generating and uniformly distributing silver ions over both confined and extended areas of land and water which comprises a manifold, a pair of silver electrodes mounted within the manifold, a means for supplying and controlling a DC electrical current to said electrodes, a means for flowing water under pressure through said manifold whereby silver ions are deposited in said water, a sprinkler/spray means, and means for supplying said ionized water to said sprinkler/spray means under pressure. Electrodes containing copper may also be used.

DETAILED DESCRIPTION OF THE PREFERRED EMBODIMENT

Figure 1:
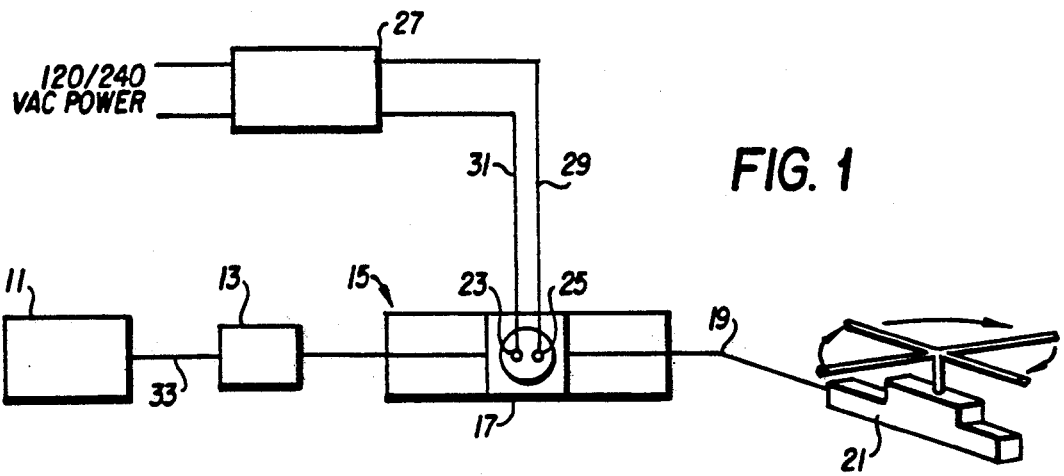
FIG. 1 is a schematic representation of the system of the present invention.

FIG. 1 is a schematic illustration of the system of the present invention. The contents of water source 11 may be either the polluted water to be treated or an alternate clear water source, which source is provided under pressure either by a pump (not shown) or from an already pressured source such as a municipal water plant. Inlet valve 13 determines the flow of water from water source 11 through conduit 33 into manifold 15 and through electrode assembly 17. The outlet from assembly 17 passes through conduit 19 to the sprinkler/spray means 21 so as to be able to uniformly spread the concentrated water solution about an area. Sprinkler/spray means 21 may be any type which can be used on land or floated on water so long as it allows a uniform distribution of the concentrated water solution.

Manifold 15 is relatively small so that it can be easily handled and moved. For instance, standard 2-inch PVC pipe and fittings may be used as described below.

Control unit 27 is a solid-state circuitry contained in a portable hand-carried control cabinet. It uses conventional circuitry to convert 120/240-volt AC power to DC power. Included is circuitry to maintain a set DC current as the conductance in the fluid increases with the decrease in electrode size and the attendant increase in space separation. Also included is a timing circuitry to periodically reverse the DC polarity. These components are commercially available.

Figure 2:
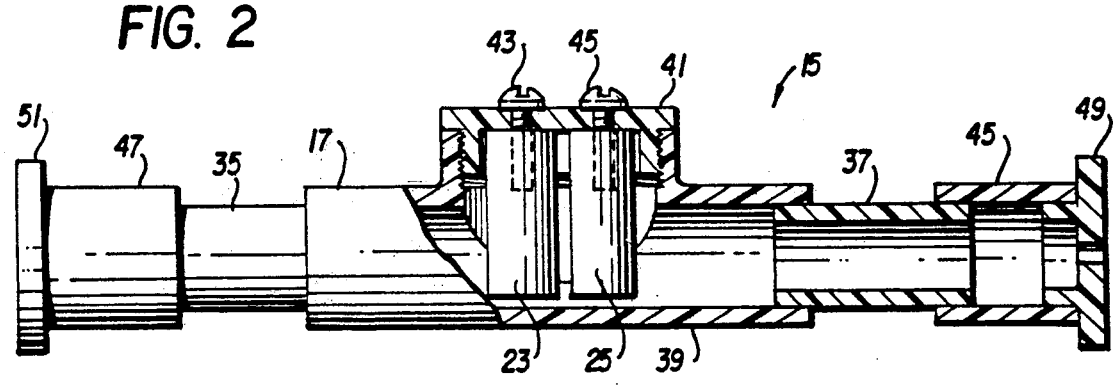
FIG. 2 is a schematic illustration of a proposed electrode assembly for use in the system of FIG. 1.

FIG. 2 is a schematic illustration of one type of manifold 15 including electrode assembly 17 which could be used. In this case, short PVC pipe sections 35 and 37 are connected to tee 39. Cap 41 is removably secured within tee 39 and includes silver electrodes 23 and 25, which are secured within the cap by means of screws 43 and 45. The screws also provide the means for connecting the leads 29 and 31 from the control unit 27 to the electrodes 23 and 25.

The other ends of short pipes 35 and 37 are connected to end caps 49 and 51 through PVC coupling pieces 45 and 47. End caps 49 and 51 contain standard NPT openings for connecting to valves 13 and/or standard piping or hose designated as conduit 19 and 33 (FIG. 1). The size of the manifold, conduits, and end cap openings may vary depending on the size and characteristics of the water system being used.

As the water passes through manifold assembly 15, silver ions are introduced into the fluid from silver electrodes 23 and 25. These are connected by leads 29 and 31 to the control unit 27. The control unit is supplied from a standard power supply, either 120 or 240 volts AC. The AC power is converted to DC, which activates the electrodes and provides the ions in accordance with Faraday's Law. The DC polarity is reversed on a short-cycle basis in order to flow ions evenly from each electrode and, thus, cause an even size reduction. A manual control setting may be provided in order to set the DC current level, which establishes the ionization level. The control circuit has provisions to maintain the current level as the electrodes wear away. The water, still under pressure and now containing a significant supply of silver ions, is directed through conduit 19 to sprinkler/spray means 21.

As indicated, the sprinkler/spray means may be placed on land for the elimination of land-based infectious bacteria which might otherwise pollute an adjacent water basin, or on a float on the water for the elimination of infectious bacteria already in the water. The valve 13 may be set to provide a spray pattern up to the maximum design of the system. In use, the spray is continued until sufficient silver ions have been disbursed to remove the bacteria on land or in the water under its pattern to an acceptable level. It is then moved to an adjacent area for similar treatment and the process is continued until all areas have been treated.

Figure 3:
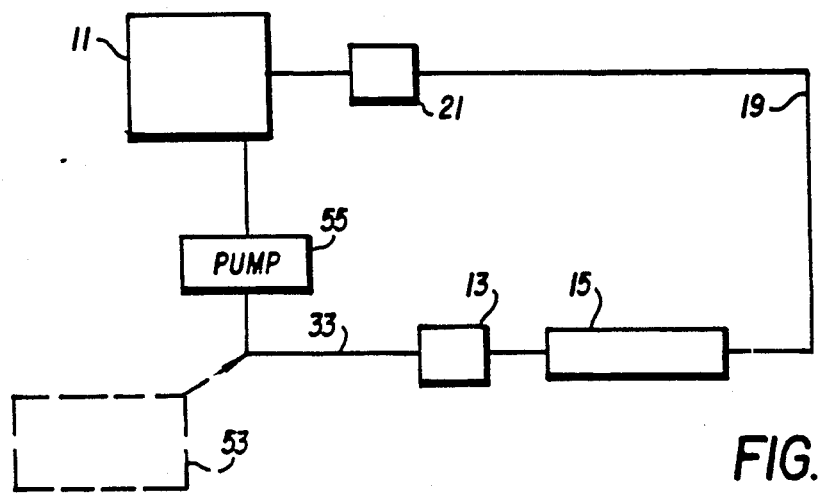
FIG. 3 is a schematic illustration of one modification of the system of FIG. 1.

FIG. 3 is a schematic illustration of a modification of the system of FIG. 1. A part of the water source 11 to be treated is pressurized with a conventional pump 55 and processed through the system as described under FIG. 1. As an alternate, water 53 already under pressure may be processed through conduit 33 in order to obtain the pressurized concentrated water/ion solution and subsequent uniform distribution over the water treatment area.

Figure 4:
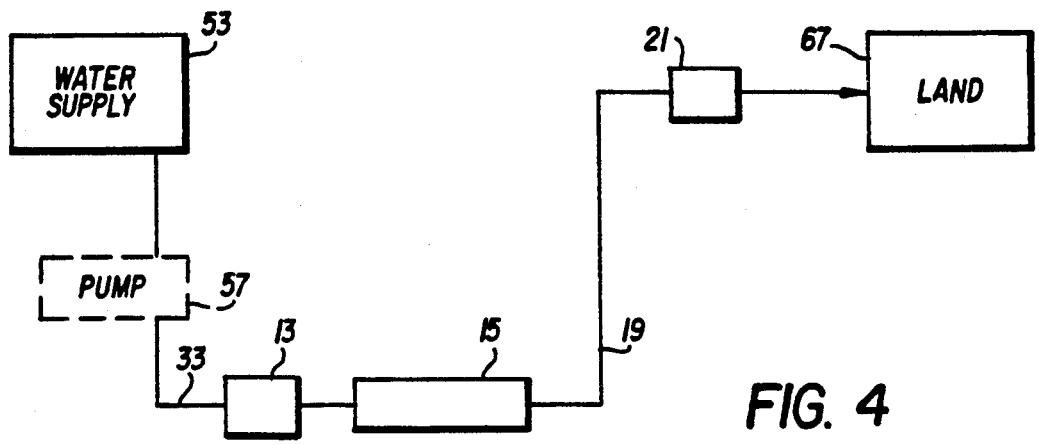
FIG. 4 is a schematic of a further modification of the system of FIG. 1.

FIG. 4 is a schematic illustration of a further modification of the system of FIG. 1. A water supply 53 is pressurized by pump 57 and processed to conduit 33. If the water source is already pressurized, it is processed directly to conduit 33, after which it is processed through the system as discussed relative to FIG. 1 and then uniformly distributed over the land treatment area 67.

Figure 5:
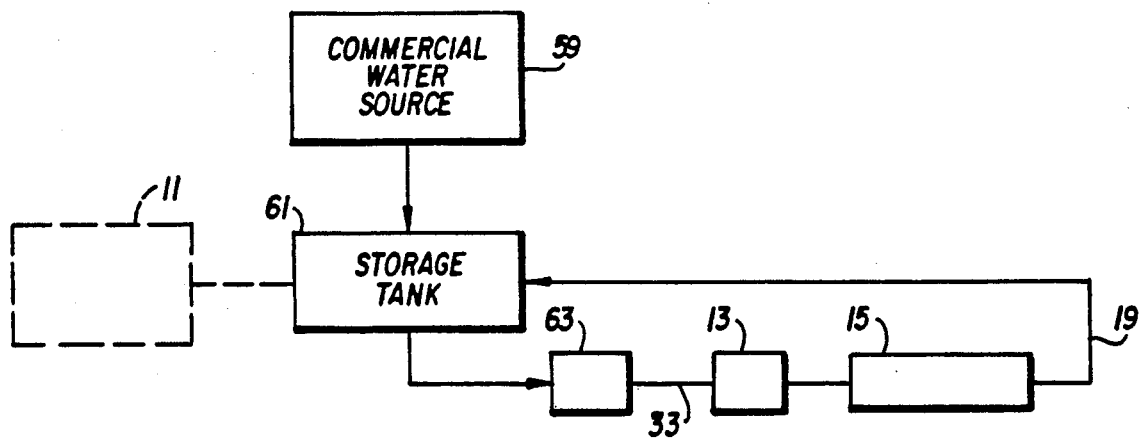
FIG. 5 is a schematic of another modification of the system of FIG. 1.

FIG. 5 is a schematic illustration of another modification of the invention. The storage and distribution tank 61 is filled with water from a commercial water source 59, or from the water to be treated source 11 if at the treatment site, and recirculated by pump 63 through the system described relative to FIG. 1 to sufficiently concentrate the solution with silver ions to treat the designated area.

Figure 6:
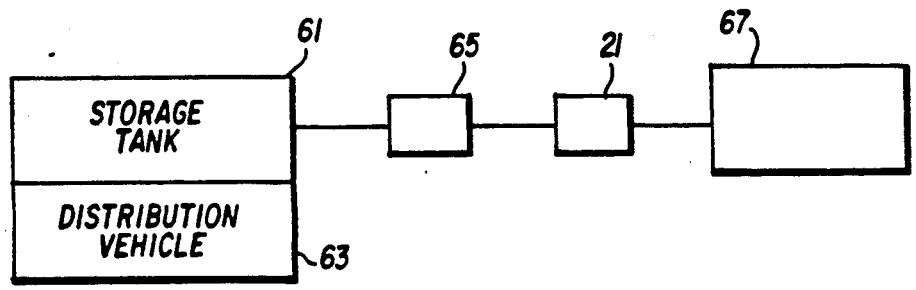
FIG. 6 is a schematic of a still further modification of the system of FIG. 1.

Referring to the modification of FIG. 6, storage/distribution tank 61 is mounted on distribution vehicle 63. The distribution vehicle treats the area 67 as described relative to FIG. 1 with a pressurized solution which has been delivered to sprinkler/spray means 21 by a pump 65 from storage/distribution tank 61.

Figure 7:
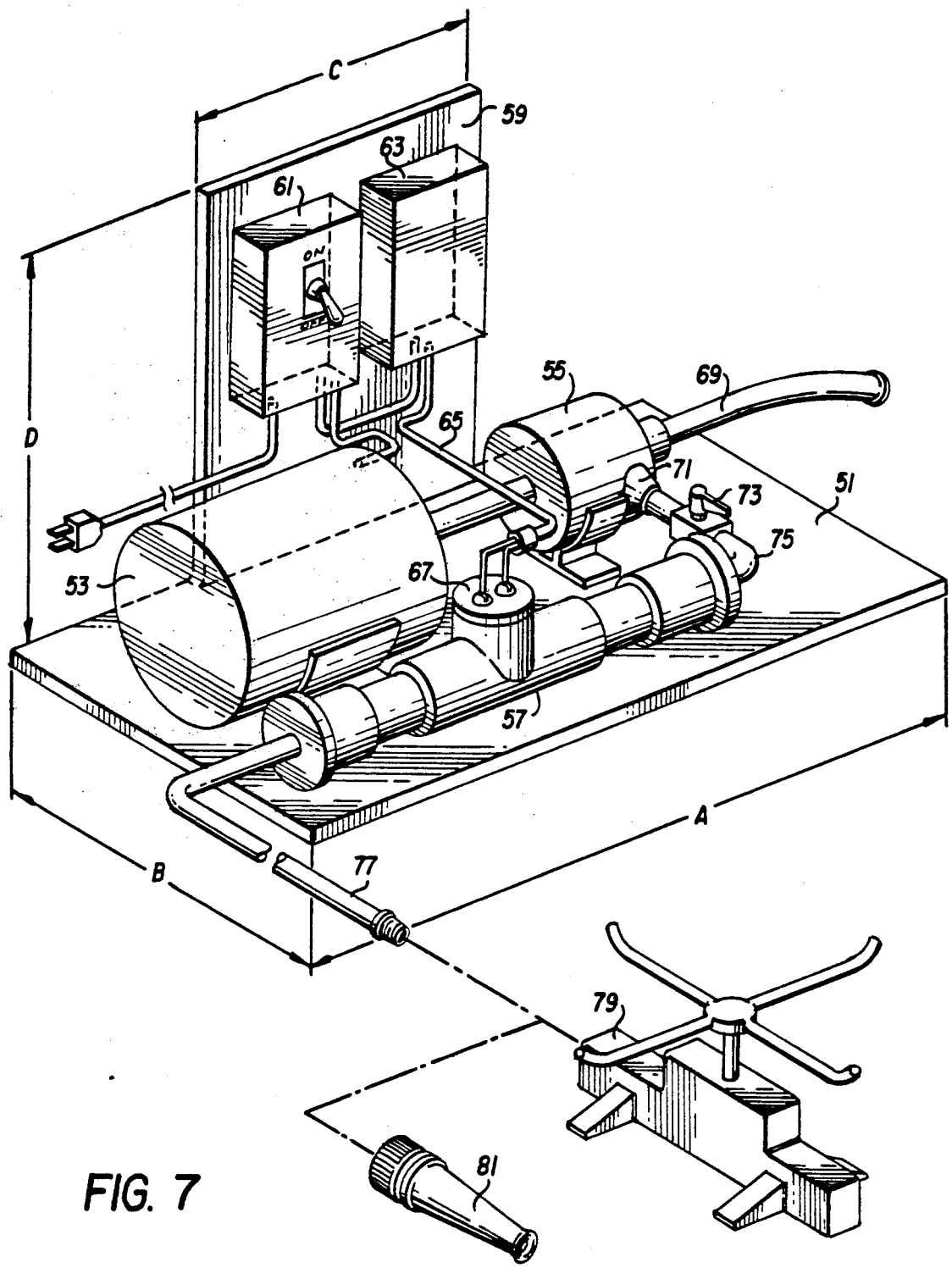
FIG. 7 is an illustration of portable apparatus using the present invention.

FIG. 7 is an illustration of a portable disinfecting apparatus which provides the functions set forth above.

Base or platform 51 provides a mounting surface for motor 53, pump 55, and manifold 57. Panel 59 is mounted on base 51 and supports junction box 61 and ion control unit 63. Leads 65 from control unit 63 are connected to electrode assembly 67 of manifold 57. Water inlet hose 69 extends from pump 55, which provides water through pump discharge 71 and throttle valve 73 through piping 75 to manifold 57. Treated water is supplied through hose 77 to either sprinkler 79 or nozzle 81.

The portable disinfection apparatus of FIG. 7 may have the following dimensions:

A = 24 Inches
B = 16 Inches
C = 18 Inches
D = 16 Inches

As will be obvious, such apparatus provides a compact, portable system which is easily movable to any desired location.

The above description and drawings are illustrative only since various modifications and component substitution could be provided without departing from the invention, the scope of which is to be limited only by the following claims.

I claim:

1. Apparatus for generating and distributing ions of a selected element over areas of land and water comprising
   a manifold;
   a pair of electrodes composed of said element mounted within said manifold;
   means for supplying an electric current to said electrodes;
   means for flowing water under pressure through said manifold whereby ions are deposited in said water;
   means for distributing water over extended land and water areas; and
   means for supplying said ionized water to said water distribution means.

2. The apparatus of claim 1 wherein said electrodes are silver.

3. The apparatus of claim 1 wherein said electrodes are copper.

4. The apparatus of claim 1 wherein said electrodes are silver/copper.

5. The apparatus of claim 1 wherein said water distribution means is a sprinkler head.

6. The apparatus of claim 1 wherein said water distribution means is a nozzle.

7. The apparatus of claim 1 further comprising means for adjusting the pressure of said water through said manifold.

8. Apparatus for generating and distributing ions of silver over areas of land and water comprising
   a manifold;
   a pair of silver electrodes mounted within said manifold;
   means for supplying an electric current to said electrodes;
   means for flowing water under pressure through said manifold so that a concentration of silver ions are deposited in said water;
   means for combining said ion-concentrated water with untreated water;
   means for distributing water over extending land and water areas; and
   means for supplying said combined water to said water distribution means.

9. A method for uniformly distributing silver ions over areas of land and water comprising
   delivering a controlled amount of water under pressure through a manifold;
   uniformly depositing silver ions in said water so as to provide a concentrated level of silver ions in said controlled amount of water;
   combining said controlled amount of water with a volume of untreatd water; and
   uniformly spraying said combined water over extended land and water areas.

* * * * *